(12) United States Patent
Hamagami et al.

(10) Patent No.: US 11,341,751 B2
(45) Date of Patent: May 24, 2022

(54) INFORMATION PROCESSING SYSTEM, PROGRAM, AND CONTROL METHOD

(71) Applicant: TOYOTA JIDOSHA KABUSHIKI KAISHA, Toyota (JP)

(72) Inventors: Kana Hamagami, Nissin (JP); Takuya Maekawa, Nissin (JP); Yosuke Nakayama, Owariasahi (JP); Akitoshi Jikumaru, Nissin (JP); Tae Sugimura, Miyoshi (JP); Takao Hishikawa, Nagoya (JP); Shinichi Adachi, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 350 days.

(21) Appl. No.: 16/782,184

(22) Filed: Feb. 5, 2020

(65) Prior Publication Data

US 2020/0272830 A1 Aug. 27, 2020

(30) Foreign Application Priority Data

Feb. 25, 2019 (JP) .............................. JP2019-032033

(51) Int. Cl.
*G06K 9/00* (2022.01)
*G06V 20/56* (2022.01)
(Continued)

(52) U.S. Cl.
CPC .............. *G06V 20/56* (2022.01); *B60R 11/04* (2013.01); *G06K 7/1417* (2013.01);
(Continued)

(58) Field of Classification Search
CPC . B60R 11/04; B60R 2300/80; G06Q 20/0855; G06Q 20/102; G06Q 20/127;
(Continued)

(56) References Cited

U.S. PATENT DOCUMENTS

2020/0143422 A1* 5/2020 Goto ....................... G06V 40/10
2021/0103287 A1* 4/2021 Shapira .................. B62D 6/001

FOREIGN PATENT DOCUMENTS

JP 2008-107945 A 5/2008
JP 2008-257540 A 10/2008
(Continued)

OTHER PUBLICATIONS

Ozan, Erol. "QR Code Based Signage to Support Automated Driving Systems on Rural Area Roads." International Joint conference on Industrial Engineering and Operations Management. Springer, Cham, 2018. (Year: 2018).*

(Continued)

*Primary Examiner* — Avinash Yentrapati
(74) *Attorney, Agent, or Firm* — Oblon, McClelland, Maier & Neustadt, L.L.P.

(57) ABSTRACT

A vehicle captures an identification mark with an external camera, the identification mark being associated with content provided by a service provider; acquires the content associated with the captured identification mark; outputs the acquired content to the occupant in a cabin of the vehicle; acquires payment information based on the output content; and acquires information on the occupant in the cabin. A server identifies the occupant based on the information on the occupant, acquired by the vehicle; and transmits information on payment processing including the payment information, acquired from the vehicle, to the information processing terminal held by the identified occupant. The information processing terminal displays the information on the payment processing acquired from the server.

7 Claims, 8 Drawing Sheets

(51) Int. Cl.
    *G06K 7/14*          (2006.01)
    *B60R 11/04*       (2006.01)
    *G06Q 20/10*       (2012.01)
    *G06Q 20/32*       (2012.01)
    *G06V 20/59*       (2022.01)

(52) U.S. Cl.
    CPC ......... *G06K 7/1447* (2013.01); *G06Q 20/102* (2013.01); *G06Q 20/325* (2013.01); *G06V 20/59* (2022.01); *B60R 2300/80* (2013.01)

(58) Field of Classification Search
    CPC ............. G06Q 20/145; G06Q 20/3224; G06Q 20/325; G06Q 20/4015; G06V 20/50; G06V 20/56; G06V 20/59; G06V 2201/10; G06V 40/10; G06V 40/172; G06V 2201/07
    See application file for complete search history.

(56) References Cited

FOREIGN PATENT DOCUMENTS

| | | |
|---|---|---|
| JP | 4916274 B2 | 4/2012 |
| JP | 5015749 B2 | 8/2012 |

OTHER PUBLICATIONS

U.S. Appl. No. 16/666,507, filed Oct. 29, 2019.

\* cited by examiner

| IDENTIFICATION MARK | INFORMATION ON OCCUPANT | CONTENT |
|---|---|---|
| S1 | NUMBER OF PERSONS: 3 GENDER: MALE, FEMALE, BOY AGE: 40-YEAR-OLD, 35-YEAR-OLD, 0-YEAR-OLD | FACILITY INFORMATION OF COMMERCIAL FACILITY: BABY GOODS STORE COUPON INFORMATION: DISCOUNT COUPON FOR BABY GOODS |
| S2 | NUMBER OF PERSONS: 4 GENDER: MALES FEELING HUNGRY | FACILITY INFORMATION OF COMMERCIAL FACILITY: RESTAURANT COUPON INFORMATION: RESTAURANT'S DISCOUNT COUPON |
| S3 | FACE | PRODUCT DETAILS: PRODUCT MOST FREQUENTLY ORDERED IN THE PAST |
| ... | ... | ... |

INFORMATION PROCESSING SYSTEM, PROGRAM, AND CONTROL METHOD

INCORPORATION BY REFERENCE

The disclosure of Japanese Patent Application No. 2019-032033 filed on Feb. 25, 2019 including the specification, drawings and abstract is incorporated herein by reference in its entirety.

BACKGROUND

1. Technical Field

The present disclosure relates to an information processing system, a program, and a control method.

2. Description of Related Art

Conventionally, it is well known technology that an identification mark is captured by an external camera mounted on a vehicle, and the vehicle acquires content associated with the identification mark. For example, JP-B-5015749 discloses a vehicle location detection device in which a barcode or a QR code (registered trademark), drawn on a road surface in an indoor facility and including location information, is captured by an in-vehicle camera, and a location of a vehicle is detected based on the location information included in the captured barcode or QR code.

SUMMARY

There is growing demand for providing content from a service provider to an occupant of a vehicle by effectively using an identification mark associated with content including, for example, product details, instead of using a fixed identification mark associated to fixed content, such as location information. In this case, it is desirable to, for example, provide a payment processing method with less restrictions to the occupant of the vehicle, which is required as the occupant selects the content.

The present disclosure is made to provide an information processing system, a program, and a control method, each of which is capable of reducing the restrictions in the payment processing method upon providing the content to the occupant of the vehicle by effectively using the identification mark.

An information processing system according to one embodiment of the present disclosure include a vehicle, a server communicatively connected to the vehicle, and an information processing terminal that is held by an occupant of the vehicle and communicatively connected to the server. The vehicle captures an identification mark by an external camera, the identification mark being associated with content provided by a service provider, acquires the content associated with the captured identification mark, outputs the acquired content to the occupant in a cabin of the vehicle, acquires payment information based on the output content, and acquires information on the occupant in the cabin. The server identifies the occupant based on the information on the occupant acquired by the vehicle and transmits information on payment processing including the payment information, acquired from the vehicle, to the information processing terminal held by the identified occupant. The information processing terminal displays the information on the payment processing acquired from the server.

A program according to one embodiment of the present disclosure is a program operated in an information processing system including a vehicle, a server communicatively connected to the vehicle, and an information processing terminal that is held by an occupant of the vehicle and communicatively connected to the server. The program causes the vehicle to capture an identification mark by an external camera, the identification mark being associated with content provided by a service provider; acquire the content associated with the captured identification mark; output the acquired content to the occupant in a cabin of the vehicle; acquire payment information based on the output content; and acquire information on the occupant in the cabin. The program causes the server to identify the occupant based on the information on the occupant, acquired by the vehicle; and transmit information on payment processing including the payment information, acquired from the vehicle, to the information processing terminal held by the identified occupant. The program causes the information processing terminal to display the information on the payment processing acquired from the server.

A control method according to one embodiment of the present disclosure is a control method adopted in an information processing system including a vehicle, a server communicatively connected to the vehicle, and an information processing terminal that is held by an occupant of the vehicle and communicatively connected to the server. The control method, in the vehicle, includes steps of capturing an identification mark with an external camera, the identification mark being associated with content provided by a service provider; acquiring the content associated with the captured identification mark; outputting the acquired content to the occupant in a cabin of the vehicle; acquiring payment information based on the output content; and acquiring information on the occupant in the cabin. The control method, in the server, includes steps of identifying the occupant based on the information on the occupant acquired by the vehicle and transmitting information on payment processing including the payment information, acquired from the vehicle, to the information processing terminal held by the identified occupant. The control method, in the information processing terminal, includes a step of displaying the information on the payment processing acquired from the server.

With the information processing system, the program, and the control method according to one embodiment of the present disclosure, it is possible to reduce the restrictions in the payment processing method upon providing the content to the occupant of the vehicle by effectively using the identification mark.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, one embodiment of the present disclosure will be described with reference to drawings.

Figure 1:
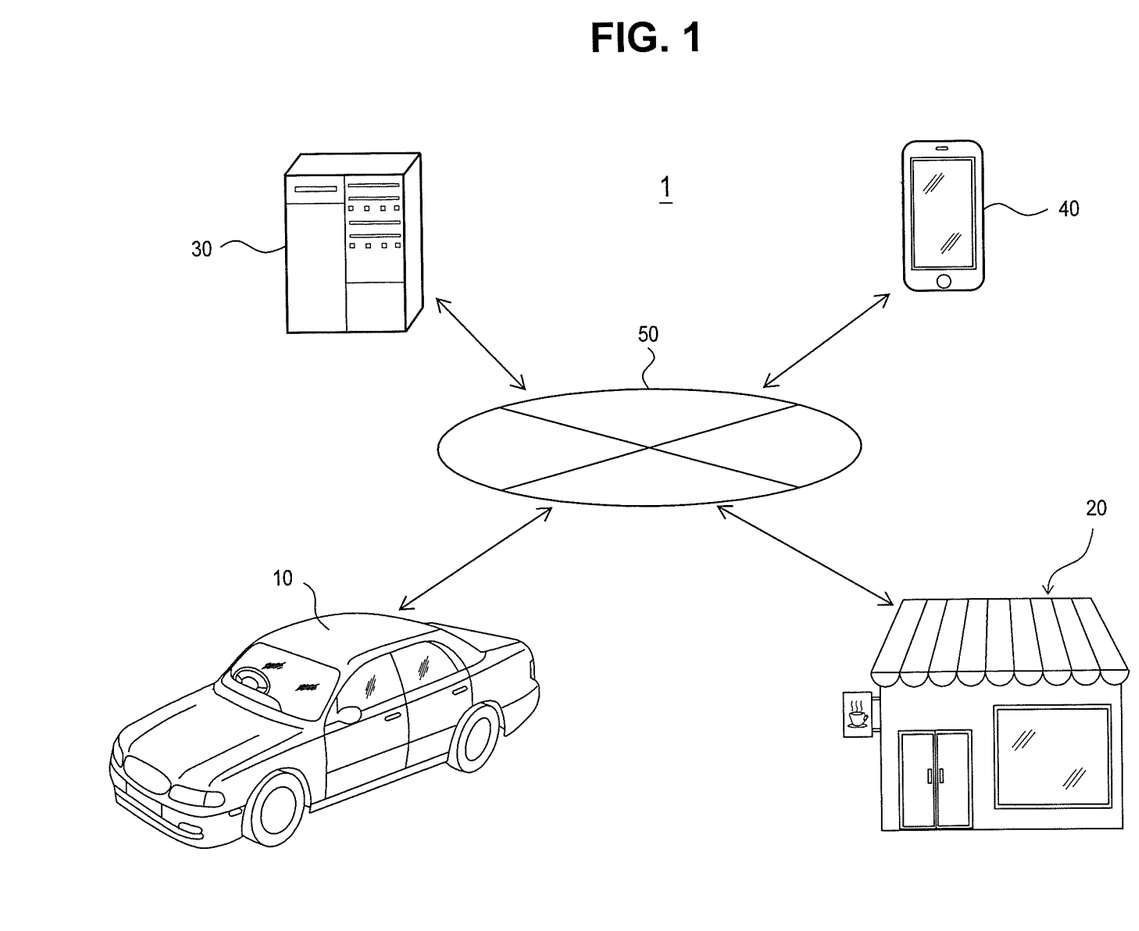
FIG. 1 is a diagram illustrating a schematic configuration example of an information processing system according to one embodiment of the present disclosure.

FIG. 1 is a diagram illustrating a schematic configuration example of an information processing system 1 according to one embodiment of the present disclosure. Referring to FIG. 1, a configuration and functions of the information processing system 1 according to one embodiment of the present disclosure will be mainly described.

The information processing system 1 includes a vehicle 10, an information processing apparatus 20, a server 30, and an information processing terminal 40. Each of the vehicle 10, the information processing apparatus 20, the server 30, and the information processing terminal 40 is connected to be communicable with other components via a network 50 including, for example, a mobile communication network and the Internet.

The vehicle 10 is, for example, an automobile but is not limited to the automobile and may be any vehicle in which people can enter. The vehicle 10 is a vehicle driven by a driver but is not limited thereto and may be, for example, a vehicle traveling by means of autonomous driving. The term "autonomous driving" herein refers to, for example, levels 1 to 5 defined by Society of Automotive Engineers (SAE) but is not limited thereto and may be voluntarily defined. In FIG. 1, only one vehicle 10 is illustrated for convenience of description, but the information processing system 1 may include one or more vehicles 10.

The information processing apparatus 20 is, for example, one or more server devices, which can communicate with each other, owned by a service provider that provides a voluntary service to customers including the occupant of the vehicle 10. However, the information processing apparatus 20 is not limited thereto, and may be any general-purpose electronic device such as a personal computer (PC) or a smartphone, or alternatively, may be another electronic device dedicated to the information processing system 1. The service provider runs, for example, a store or a commercial facility.

The server 30 is, for example, a general-purpose information processing apparatus having a function of a server device which is owned by a company that provides a payment service such as a credit card company. The server 30 may be one or more information processing apparatuses which can communicate with each other. However, the server 30 is not limited thereto, and may be another information processing apparatus dedicated to the information processing system 1. In FIG. 1, only one server 30 is illustrated as an example for convenience of description.

The information processing terminal 40 is, for example, a smartphone held by an occupant of the vehicle 10. However, the information processing terminal 40 is not limited thereto, and may be any general-purpose electronic device, such as a PC or a tablet PC, held by the occupant of the vehicle 10, or alternatively, may be another electronic device dedicated to the information processing system 1.

Figure 2:
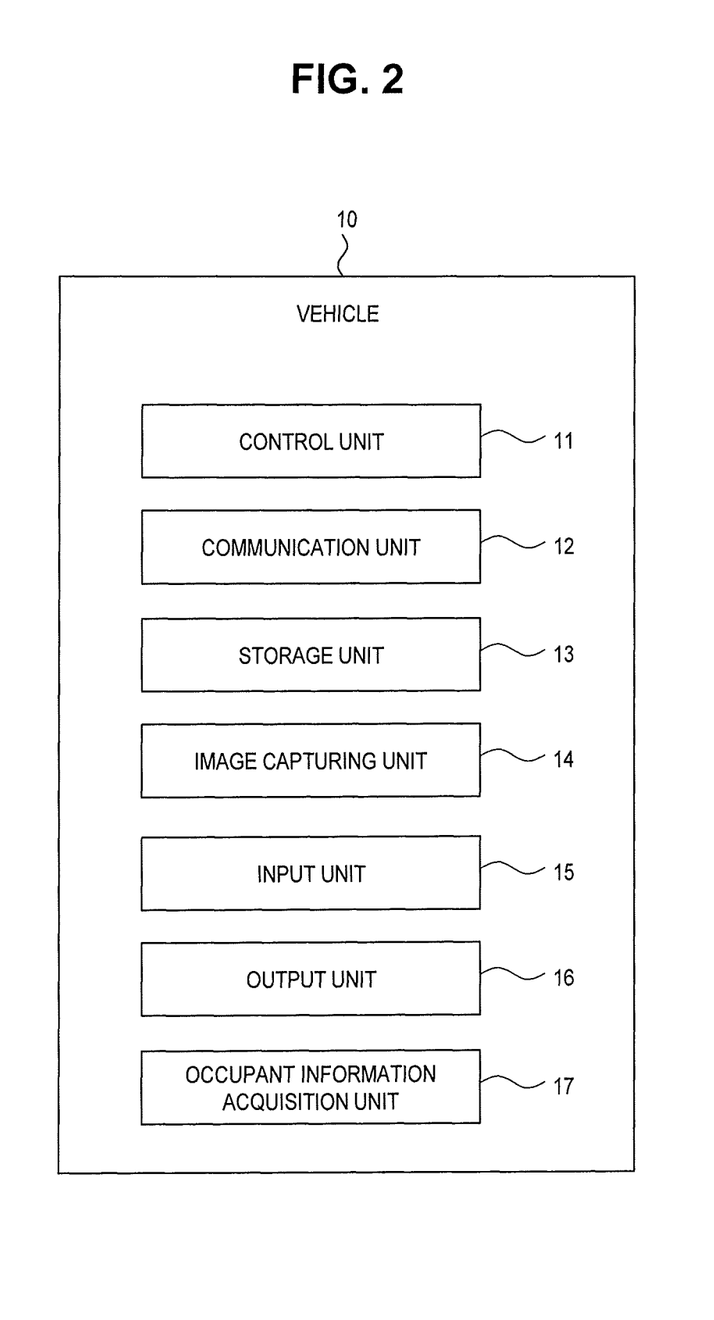
FIG. 2 is a block diagram illustrating a schematic configuration of a vehicle in FIG. 1.

FIG. 2 is a block diagram illustrating a schematic configuration of the vehicle 10 in FIG. 1.

The vehicle 10 includes a control unit 11, a communication unit 12, a storage unit 13, an image capturing unit 14, an input unit 15, an output unit 16, and an occupant information acquisition unit 17. These components constituting the vehicle 10 are connected to each other through, for example, an in-vehicle network such as a controller area network (CAN) or a dedicated line, whereby the components can communicate with each other.

As an overview of one embodiment, the image capturing unit 14 captures an identification mark by an external camera. The identification mark is associated with content provided by the service provider. The content includes, for example, product details provided by the service provider to a customer, payment information associated with a product ordered by the customer, crowd status of the store or the commercial facility, facility information on the commercial facility, parking lot status of the store or the commercial facility, and coupon information on coupons available at the store or the commercial facility. The control unit 11 may determine whether the image capturing unit 14 has captured the identification mark. For example, in a case where the control unit 11 determines that the image capturing unit 14 has captured the identification mark, the control unit 11 acquires content associated with the captured identification mark. The control unit 11 outputs the acquired content, through the output unit 16, to the occupant in a cabin of the vehicle 10. The occupant of the vehicle 10 refers to a driver of the vehicle 10 and a fellow passenger. The number of occupants in the vehicle 10 may be one or more.

The occupant information acquisition unit 17 acquires information on the occupant in the cabin of the vehicle 10. The control unit 11 acquires payment information based on the output content. The server 30 identifies the occupant based on the information on the occupant, acquired by the occupant information acquisition unit 17 of the vehicle 10, and transmits information on payment processing including the payment information, acquired from the vehicle 10, to the information processing terminal 40 held by the identified occupant. The information processing terminal 40 displays the information on the payment processing, acquired from the server 30.

Each schematic configuration of the vehicle 10 will be described in detail hereinbelow.

The control unit 11 has one or more processors. The "processor" in one embodiment is a general-purpose processor or a dedicated processor specialized for a specific processing, but is not limited thereto. For example, an electronic control unit (ECU) mounted on the vehicle 10 may function as the control unit 11. The control unit 11 is, for example, communicably connected to components constituting the vehicle 10 and controls the operation of the entire vehicle 10. In one embodiment, for example, the control unit 11 controls the image capturing unit 14, the input unit 15, and the occupant information acquisition unit 17 to acquire various types of information.

The communication unit 12 includes a communication module that communicates via an in-vehicle network or a dedicated line. The communication unit 12 has a communication module connected to the network 50. For example, the communication unit 12 may include a communication module corresponding to a mobile communication standard such as 4G, 5G, or the like. For example, a data communication module (DCM) mounted on the vehicle 1 may function as the communication unit 12. In one embodiment, the vehicle 10 is connected to the network 50 via the communication unit 12.

The storage unit 13 includes one or more memories. The "memory" in one embodiment is, for example, a semiconductor memory, a magnetic memory, or an optical memory, but is not limited thereto. Each memory included in the storage unit 13 may function as, for example, a main storage device, an auxiliary storage device, or a cache memory. The storage unit 13 stores random information used in the operation of the vehicle 10. The storage unit 13 may store, for example, a system program, an application program, various types of information acquired by the vehicle 10, and the like. The information stored in the storage unit 13 may be updated by, for example, information acquired from the network 50 via the communication unit 12.

The image capturing unit 14 includes the external camera that captures the outside of the vehicle 10. The image capturing unit 14 captures the identification mark with the external camera. The identification mark is associated with content updated at any time on a side of the service provider and varies together with the content. The identification mark includes a QR code. However, the identification mark is not limited thereto, and may include an optional mark such as a barcode. For example, the image capturing unit 14 may capture such an identification mark while constantly capturing the outside of the vehicle 10, or alternatively, may capture such an identification mark based on an operation of the occupant of the vehicle 10, by means of the input unit 15.

The image capturing unit 14 or the control unit 11 may recognize the identification mark from the image captured with the external camera by using any image recognition technology.

The input unit 15 receives an input operation from the occupant of the vehicle 10. In one embodiment, the input unit 15 includes, for example, an input interface included in a car navigation device. The input unit 15 receives the input operation from the occupant of the vehicle 10 and acquires input information from the occupant of the vehicle 10. The input unit 15 outputs, from the occupant of the vehicle 10, the acquired input information to the control unit 11.

The output unit 16 outputs the information acquired by the image capturing unit 14 to the occupant in the cabin of the vehicle 10. In one embodiment, the output unit 16 includes a car navigation device. For example, the output unit 16 includes an output device such as a liquid crystal display constituting the car navigation device. The car navigation device constituting the output unit 16 outputs, for example, content by means of at least one of images and sounds.

The output unit 16 is not limited thereto, and may include any output device stimulating at least one of vision or hearing of the occupant of the vehicle 10. The output unit 16 may include, for example, any audio output device other than the car navigation device that mainly stimulates the hearing of the occupant of the vehicle 10. The output unit 16 may include, for example, any image output device other than the car navigation device that mainly stimulates the sight of the occupant of the vehicle 10.

The occupant information acquisition unit 17 acquires the information on the occupant in the cabin of the vehicle 10. In one embodiment, the occupant information acquisition unit 17 includes an interior camera that captures the inside of the cabin of the vehicle 10. The occupant information acquisition unit 17 acquires the information on the occupant, for example, from an image captured by the interior camera.

In this case, the information on the occupant includes at least one of attributes including age, gender, nationality, and race; number of people; face; facial expression; face orientation; line of sight; blinking; iris; gesture; behavior; accessories; and driving (riding) duration, of the occupant of the vehicle 10. The occupant information acquisition unit 17 may acquire the information on the occupant at any time, or alternatively, may acquire at an appropriate timing.

The occupant information acquisition unit 17 may acquire the information on the occupant, such as face, facial expression, face orientation, line of sight, blinking, iris or the like, from an image captured with the interior camera by using, for example, a face recognition mechanism. Additionally, the occupant information acquisition unit 17 acquires the information on the occupant, for example, from an image captured with the interior camera by using any image recognition technology.

A configuration of the occupant information acquisition unit 17 is not limited to the configuration stated above. The occupant information acquisition unit 17 may include any other image sensor different from the interior camera. The occupant information acquisition unit 17 may include any other sensor connected to the CAN.

For example, the occupant information acquisition unit 17 may include a voluntary sound sensor that is installed in the cabin of the vehicle 10 and connected to the CAN. The occupant information acquisition unit 17 may acquire the information on the occupant from, for example, output information output by the sound sensor. In this case, the information on the occupant may include sound information generated by the occupant such as, for example, voiceprint, conversation, any other voices generated by the occupant to express spoken language, any other sounds generated by the occupant, or the like.

The occupant information acquisition unit 17 may acquire the information on the occupant, from the output information output by the sound sensor, by using, for example, a voice recognition mechanism and any other recognition mechanisms.

For example, the occupant information acquisition unit 17 may include, for example, a voluntary biometric sensor and a voluntary biometric authentication sensor that are installed in the cabin of the vehicle 10 and connected to the CAN. The occupant information acquisition unit 17 may acquire the information on the occupant from, for example, output information output by, for example, the biometric sensor or the biometric authentication sensor. In this case, the information on the occupant may include, for example, biological status of the occupant such as brain waves, cerebral blood flow, blood pressure, blood glucose level, blood amino acid, heart rate, pulse, body temperature, effective temperature, hunger, and fatigue; or biometric information of the occupant, such as fingerprint, and vein.

Figure 3:
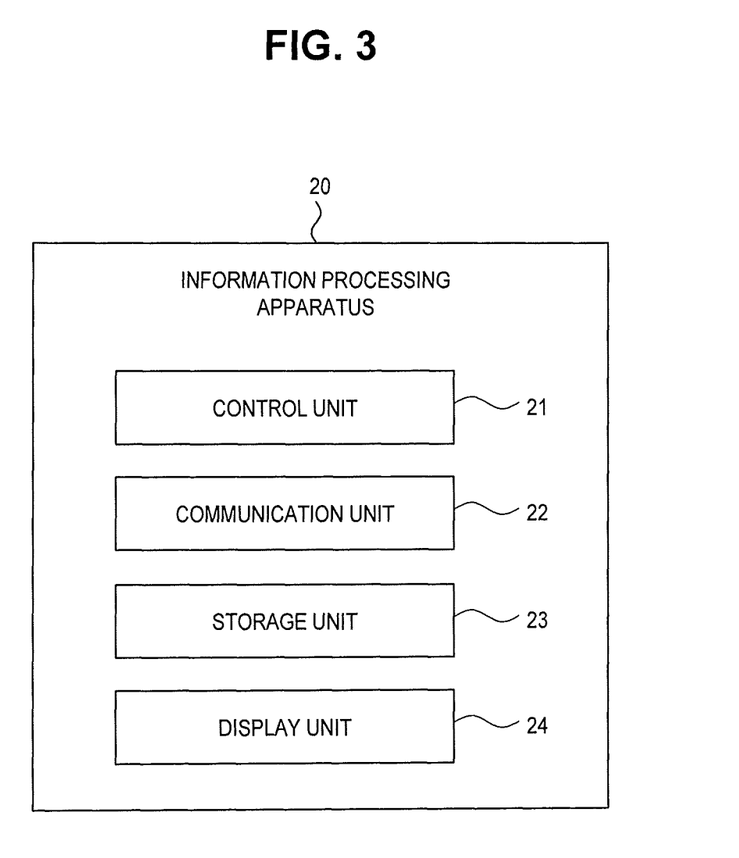
FIG. 3 is a block diagram illustrating a schematic configuration of an information processing apparatus in FIG. 1.

FIG. 3 is a block diagram illustrating a schematic configuration of the information processing apparatus 20 in FIG. 1. As illustrated in FIG. 3, the information processing apparatus 20 includes a control unit 21, a communication unit 22, a storage unit 23, and a display unit 24.

The control unit 21 has one or more processors. The control unit 21 is connected to components constituting the information processing apparatus 20 and controls the operation of the entire information processing apparatus 20. For example, the control unit 21 controls the communication unit 22 to acquire the information on the occupant from the occupant information acquisition unit 17 of the vehicle 10 via the network 50. For example, the control unit 21 controls the storage unit 23 to store information required for the operation of the information processing apparatus 20 in the storage unit 23.

The communication unit 22 has a communication module connected to the network 50. For example, the communication unit 22 may include a communication module corresponding to a wired local area network (LAN) standard. In one embodiment, the information processing apparatus 20 is connected to the network 50 via the communication unit 22.

The storage unit 23 includes one or more memories. Each memory included in the storage unit 23 may function as, for example, a main storage device, an auxiliary storage device, or a cache memory. The storage unit 23 stores random information used in the operation of the information processing apparatus 20. The information stored in the storage unit 23 may be updated by, for example, information acquired from the network 50 via the communication unit 22. The storage unit 23 may store, for example, a system program and an application program.

For example, the storage unit 23 may store the information on the occupant acquired by the occupant information acquisition unit 17 of the vehicle 10. For example, the storage unit 23 may store information on identification marks associated with content that the service provider owning the information processing apparatus 20 desires to provide to the customer, and with content that matches the information on the occupant of the vehicle 10. Additionally, the storage unit 23 may store, for example, the customer's purchase data for services provided by the service provider as big data for each customer. For example, such purchase data may be constructed by the control unit 21 for associating the information on each occupant of the vehicle 10, which has been acquired by the occupant information acquisition unit 17 of the vehicle 10 with the customer's purchase data generated when the information on the occupant was acquired.

The display unit 24 includes a voluntary display device that displays the identification mark captured by the image capturing unit 14 of the vehicle 10. For example, the display unit 24 includes a liquid crystal display. The display unit 24 may be installed, for example, at a random location in the store or the commercial facility run by the service provider. The display unit 24 may be installed, for example, in the vicinity of a drive-through entrance of the store of the service provider owning the information processing apparatus 20, in a place facing a public road by the store, or the like. The display unit 24 may also be installed, for example, near the entrance of a parking lot of the commercial facility of the service provider owning the information processing apparatus 20.

The control unit 21 may generate the identification mark in association with the content that matches the information on the occupant acquired by the occupant information acquisition unit 17 of the vehicle 10. The control unit 21 may select the content that matches the information on the occupant, from among the contents stored in the storage unit 23, based on the information on the occupant acquired by the occupant information acquisition unit 17 of the vehicle 10, by means of, for example, machine learning. The control unit 21 may have a voluntary learning processing configuration for executing such a selection process. The control unit 21 may refer to, for example, the customer's purchase data, stored as big data in the storage unit 23, upon selecting the optimal content through machine learning. The control unit 21 displays the identification mark associated with the selected content on the display unit 24.

Figure 4:
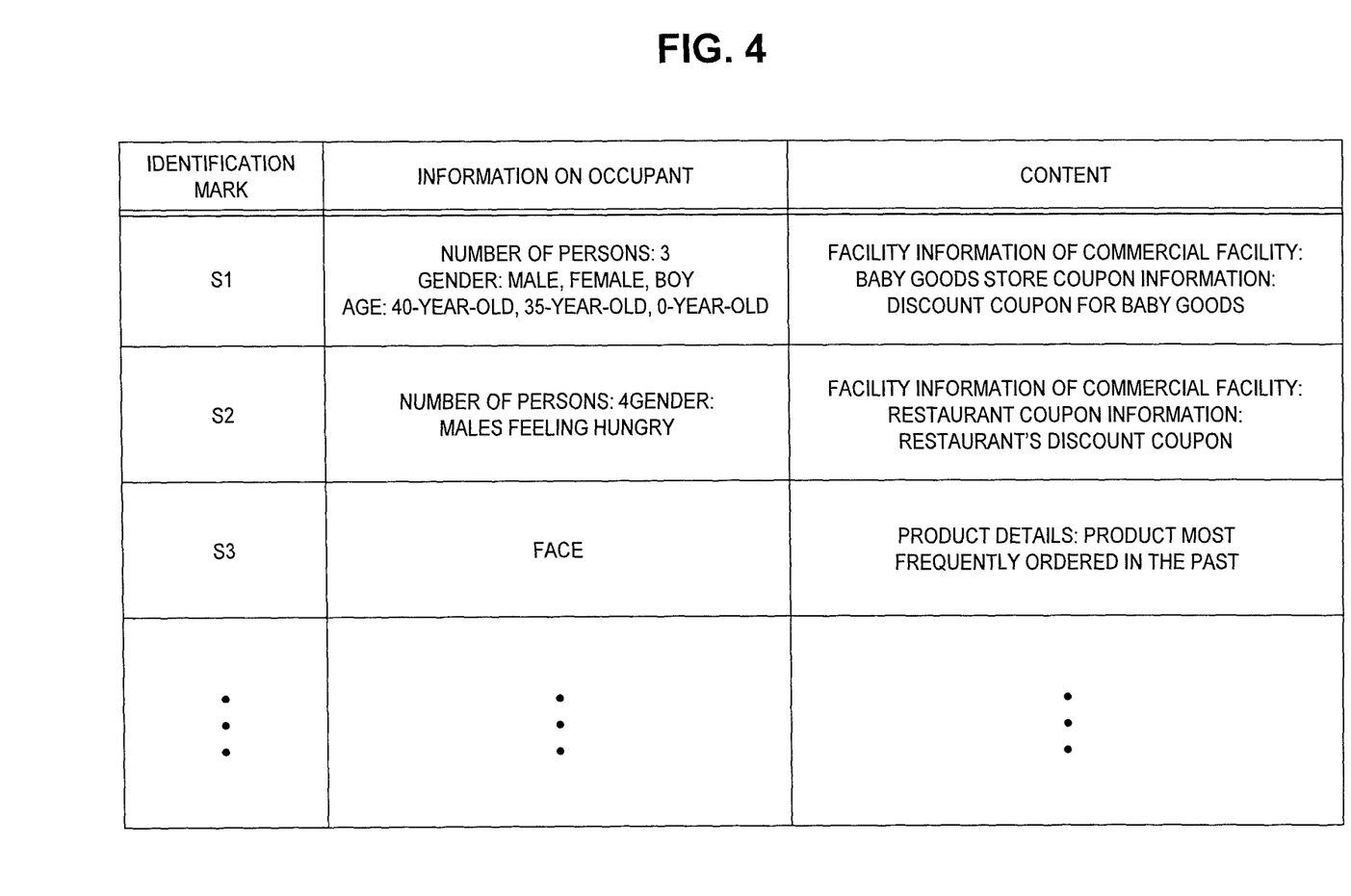
FIG. 4 is a diagram illustrating a specific example of information processed by a control unit of the information processing apparatus in FIG. 3.

FIG. 4 is a diagram illustrating a specific example of information processed by the control unit 21 of the information processing apparatus 20 in FIG. 3. Referring to FIG. 4, the information processed by the control unit 21 of the information processing apparatus 20 will be described more specifically.

For example, the control unit 21 acquires information from the vehicle 10 indicating that, as the information on the occupant acquired by the occupant information acquisition unit 17 of the vehicle 10, three occupants, a 40-year-old male, a 35-year-old female, and a boy under 1-year-old, get in the vehicle 10. In this case, the control unit 21 selects information on a baby goods store as the facility information on the commercial facility and information on a discount coupon for baby goods as the coupon information, from among the contents stored in the storage unit 23, matching the information on the occupant. The control unit 21 generates an identification mark S1 in association with these contents matching the information on the occupant and displays the identification mark S1 on the display unit 24.

As another example, the control unit 21 acquires information from the vehicle 10 indicating that, as the information on the occupant acquired by the occupant information acquisition unit 17 of the vehicle 10, four occupants, all of whom are male and feeling hungry, get in the vehicle 10. In this case, the control unit 21 selects information on a restaurant as the facility information on the commercial facility and information on a discount coupon of the restaurant as the coupon information, from among the contents stored in the storage unit 23, matching the information on the occupant. The control unit 21 generates an identification mark S2 in association with these contents matching the information on the occupant and displays the identification mark S2 on the display unit 24.

As another example, the control unit 21 acquires a face of an occupant of the vehicle 10 as the information on the occupant acquired by the occupant information acquisition unit 17 of the vehicle 10. In this case, the control unit 21 acquires the number of times the occupant of the vehicle 10 has visited the store and past purchase details based on the information on the occupant, referring to the customer's purchase data stored in the storage unit 23. The control unit 21 selects information on a product most frequently ordered in the past by the occupant of the vehicle 10, as the product details provided by the service provider to the customer, from among the contents stored in the storage unit 23, matching the information on the occupant. The control unit 21 generates an identification mark S3 in association with these contents matching the information on the occupant and displays the identification mark S3 on the display unit 24.

Figure 5:
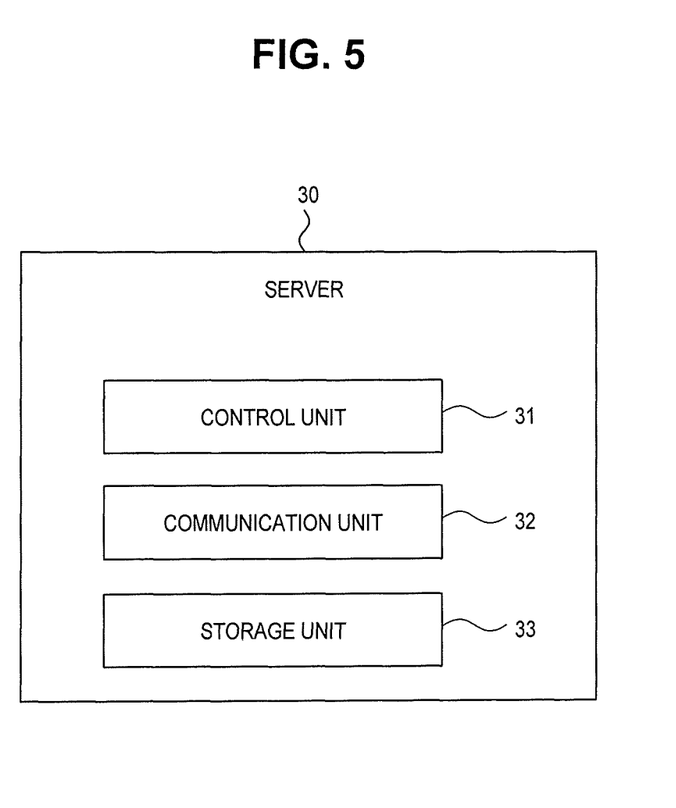
FIG. 5 is a block diagram illustrating a schematic configuration of a server in FIG. 1.

FIG. 5 is a block diagram illustrating a schematic configuration of the server 30 in FIG. 1. As illustrated in FIG. 5, the server 30 includes a control unit 31, a communication unit 32, and a storage unit 33.

The control unit 31 has one or more processors. The control unit 31 is connected to components constituting the server 30 and controls the operation of the entire server 30. For example, the control unit 31 controls the communication unit 32 to acquire the payment information (described later) from the vehicle 10 via the network 50. As another example, the control unit 31 controls the communication unit 32 to acquire the information on the occupant acquired by the vehicle 10 via the network 50. As another example, the control unit 31 controls the storage unit 33 to store information required for the operation of the server 30 in the storage unit 33.

The communication unit 32 has a communication module connected to the network 50. For example, the communication unit 32 may include a communication module corresponding to a wired local area network (LAN) standard. In one embodiment, the server 30 is connected to the network 50 via the communication unit 32.

The storage unit 33 includes one or more memories. Each memory included in the storage unit 33 may function as, for example, a main storage device, an auxiliary storage device, or a cache memory. The storage unit 33 stores random information used in the operation of the server 30. The information stored in the storage unit 33 may be updated by, for example, information acquired from the network 50 via the communication unit 32. For example, the storage unit 33 may store data in which a system program, an application program, personal authentication information of the occupant of the vehicle 10, and information on a payment method of the occupant are associated with each occupant of the vehicle 10. The information on the payment method includes, for example, information on an e-payment method such as credit card information, and electronic money information.

The control unit 11 of the vehicle 10 acquires the content associated with the identification mark captured by the image capturing unit 14. The output unit 16 of the vehicle 10 outputs the acquired content to the occupant in a cabin of the vehicle 10. The control unit 11 of the vehicle 10 acquires payment information based on the output content. For example, in a case where the content includes the product details provided by the service provider to the customer, the control unit 11 of the vehicle 10 acquires the input information from the input unit 15 when the occupant of the vehicle 10 selects a predetermined product from the product details output by the output unit 16. In this case, the control unit 11 acquires payment information associated with the selected product. The payment information includes, for example, the total amount of money that the occupant of the vehicle 10 should pay for the selected product.

The control unit 11 transmits the payment information associated with the selected product by the communication unit 12 to the external server 30 to which the information on the payment method of the occupant of the vehicle 10 is registered. Additionally, the control unit 11 transmits the information on the occupant acquired by the occupant information acquisition unit 17 by the communication unit 12 to the external server 30.

The control unit 31 of the server 30 identifies the occupant of the vehicle 10 based on the information on the occupant acquired from the vehicle 10. In particular, the control unit 31 acquires from the vehicle 10, for example, the information on biometric authentication of the occupant 10, such as face, iris, voiceprint, fingerprint, vein or the like. The control unit 31 identifies the occupant of the vehicle 10 by, for example, collating the information on the occupant with personal authentication information of the occupant of the vehicle 10, stored in the storage unit 33.

The control unit 31 transmits the information on payment processing including the payment information, acquired from the vehicle 10, to the information processing terminal 40 held by the identified occupant of the vehicle 10. The information on the payment processing may include, for example, information on the payment method in addition to the payment information.

Figure 6:
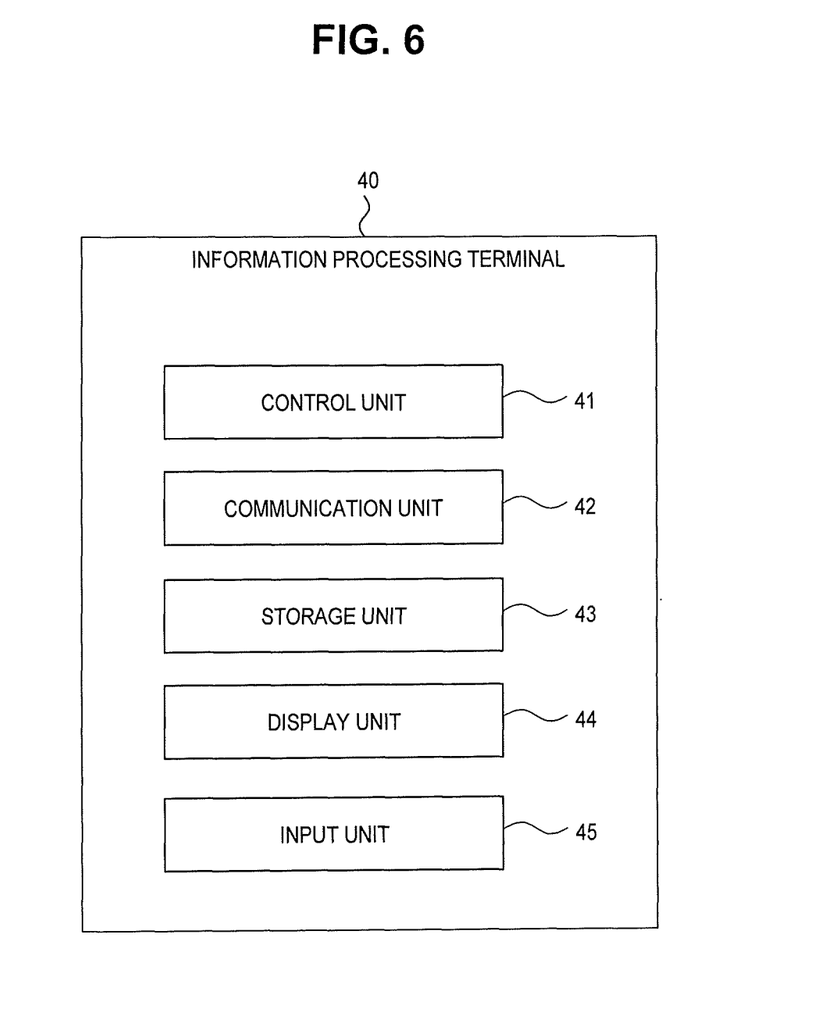
FIG. 6 is a block diagram illustrating a schematic configuration of an information processing terminal in FIG. 1.

FIG. 6 is a block diagram illustrating a schematic configuration of the information processing terminal 40 in FIG. 1. As illustrated in FIG. 6, the information processing terminal 40 includes a control unit 41, a communication unit 42, a storage unit 43, a display unit 44, and an input unit 45.

The control unit 41 has one or more processors. The control unit 41 is connected to components constituting the information processing terminal 40 and controls the operation of the entire information processing terminal 40. For example, the control unit 41 controls the communication unit 42 to acquire the information on the payment processing from the server 30 via the network 50. For example, the control unit 41 controls the storage unit 43 to store information required for the operation of the information processing terminal 40 in the storage unit 43.

The communication unit 42 has a communication module connected to the network 50. For example, the communication unit 42 may include a communication module corresponding to a mobile communication standard such as 4G or 5G, or a wired local area network (LAN) standard. In one embodiment, the information processing terminal 40 is connected to the network 50 via the communication unit 42.

The storage unit 43 includes one or more memories. Each memory included in the storage unit 43 may function as, for example, a main storage device, an auxiliary storage device, or a cache memory. The storage unit 43 stores random information used in the operation of the information processing terminal 40. The information stored in the storage unit 43 may be updated by, for example, information acquired from the network 50 via the communication unit 42. The storage unit 43 may store, for example, a system program, an application program, and the information on payment processing acquired from the server 30. For example, the storage unit 43 may store an application program for operating a payment application corresponding to the information processing system 1.

The display unit 44 includes, for example, a display of the smartphone held by the occupant of the vehicle 10. However, the display unit 44 is not limited thereto, and may include a display of any general-purpose electronic device, such as a PC or a tablet PC, held by the occupant of the vehicle 10, or alternatively, may include a display of another electronic device dedicated to the information processing system 1. The display unit 44 displays the information on the payment processing acquired from the server 30 by the control unit 41. For example, the display unit 44 displays a screen related to the payment application corresponding to the information processing system 1. In this case, for example, the payment information associated with the product selected by the occupant of the vehicle 10 is displayed on the screen related to the payment app. For example, the information on the payment method of the occupant of the vehicle 10 may also be displayed on the screen related to the payment application in addition to the payment information. The application program for operating such payment application is read from the storage unit 43 by the control unit 41 and then executed.

The input unit 45 includes, for example, an input interface of a smartphone held by the occupant of the vehicle 10. However, the input unit 45 is not limited thereto, and may include an input interface of any general-purpose electronic device, such as a PC or a tablet PC, held by the occupant of the vehicle 10, or alternatively, may include an input interface of another electronic device dedicated to the information processing system 1. The input unit 45 receives the input operation from the occupant of the vehicle 10 and acquires the input information from the occupant of the vehicle 10. The input unit 45 outputs, from the occupant of the vehicle 10, the acquired input information to the control unit 41.

A flow to the completion of the corresponding payment, based on the input operation of the input unit 45 from the occupant of the vehicle 10, is as follows. As an example, the occupant of the vehicle 10 performs the input operation for operating the input unit 45 to complete the corresponding payment processing while confirming the information on the payment processing displayed on the display unit 44 of the information processing terminal 40 held by the occupant. The control unit 41 of the information processing terminal 40 acquires, from the input unit 45, the input information on a request for completing the payment, and then transmits the input information to the server 30 via the communication unit 42. The control unit 31 of the server 30 acquires the input information, and then executes the payment processing based on the information on the payment method of the occupant of the vehicle 10, stored in the storage unit 33. For example, the control unit 31 transmits results of the payment processing to the information processing apparatus 20 and the information processing terminal 40 via the network 50. Consequently, the payment processing via the server 30 is completed.

Figure 7:
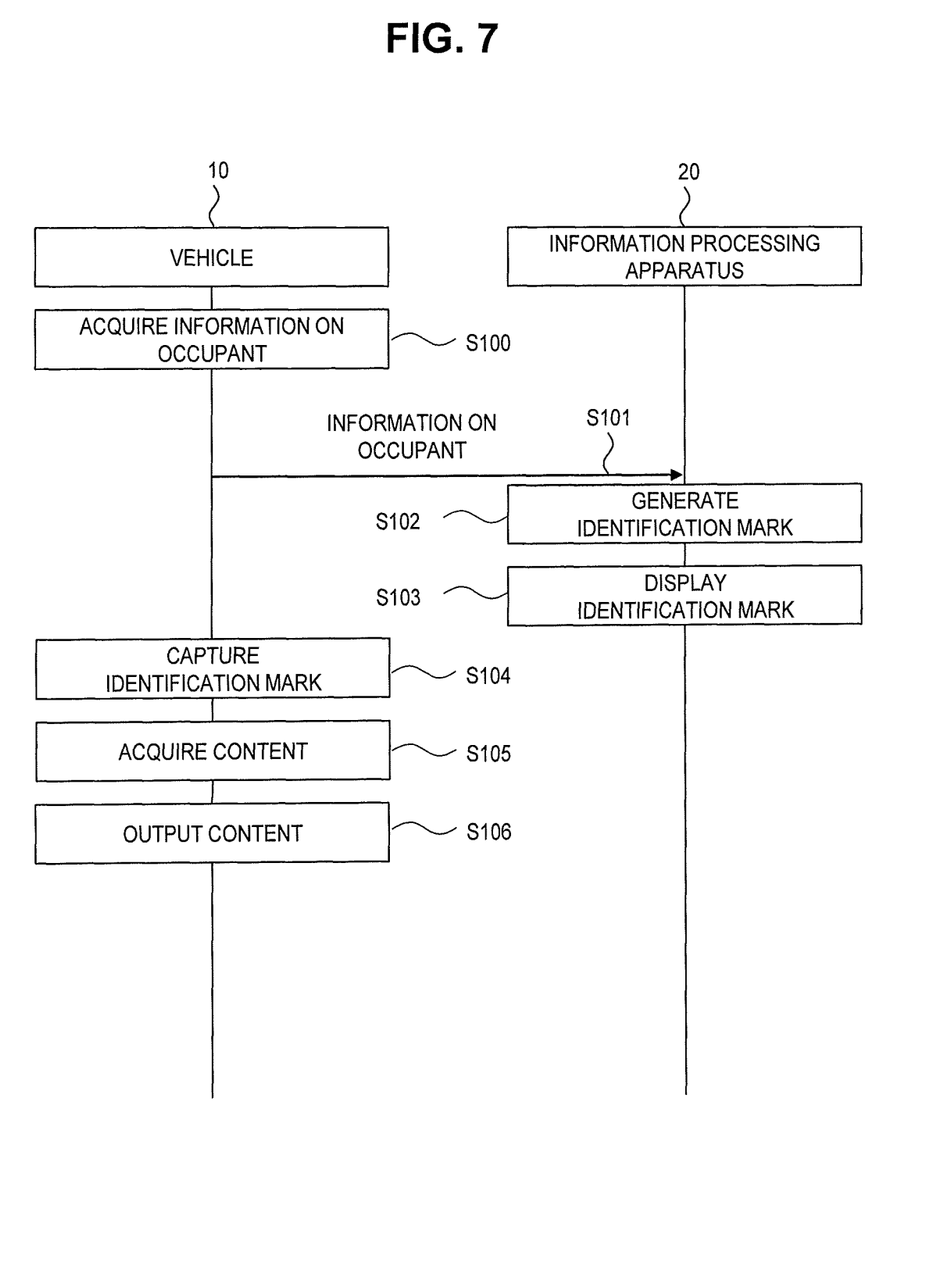
FIG. 7 is a sequence diagram illustrating a first example of an operation flow of the information processing system.

FIG. 7 is a sequence diagram illustrating a first example of an operation flow of the information processing system 1. FIG. 7 illustrates one example of a flow of providing the content to the occupant of the vehicle 10, which is executed between the vehicle 10 and the information processing apparatus 20. Referring to FIG. 7, one example of the operation flow of the information processing system 1 will be described.

Step S100: The control unit 11 of the vehicle 10 acquires the information on the occupant in the cabin of the vehicle 10 by means of the occupant information acquisition unit 17.

Step S101: The control unit 11 of the vehicle 10 transmits the information on the occupant, acquired in step S100, to the information processing apparatus 20 by means of the communication unit 12.

Step S102: The control unit 21 of the information processing apparatus 20 generates the identification mark in association with the content that matches the information on the occupant, based on the information on the occupant acquired from the vehicle 10 in step S101. In this case, the control unit 21 may refer to, for example, the customer's purchase data stored as big data in the storage unit 23 if needed.

Step S103: The control unit 21 of the information processing apparatus 20 displays, on the display unit 24, the identification mark generated in step S102.

Step S104: The control unit 11 of the vehicle 10 captures the identification mark displayed on the display unit 24 of the information processing apparatus 20 in step S103, by means of the image capturing unit 14.

Step S105: The control unit 11 of the vehicle 10 acquires the content associated with the identification mark captured by the image capturing unit 14 in step S104.

Step S106: The control unit 11 of the vehicle 10 outputs the content acquired in step S105, by means of the output unit 16, to the occupant in a cabin of the vehicle 10.

Figure 8:
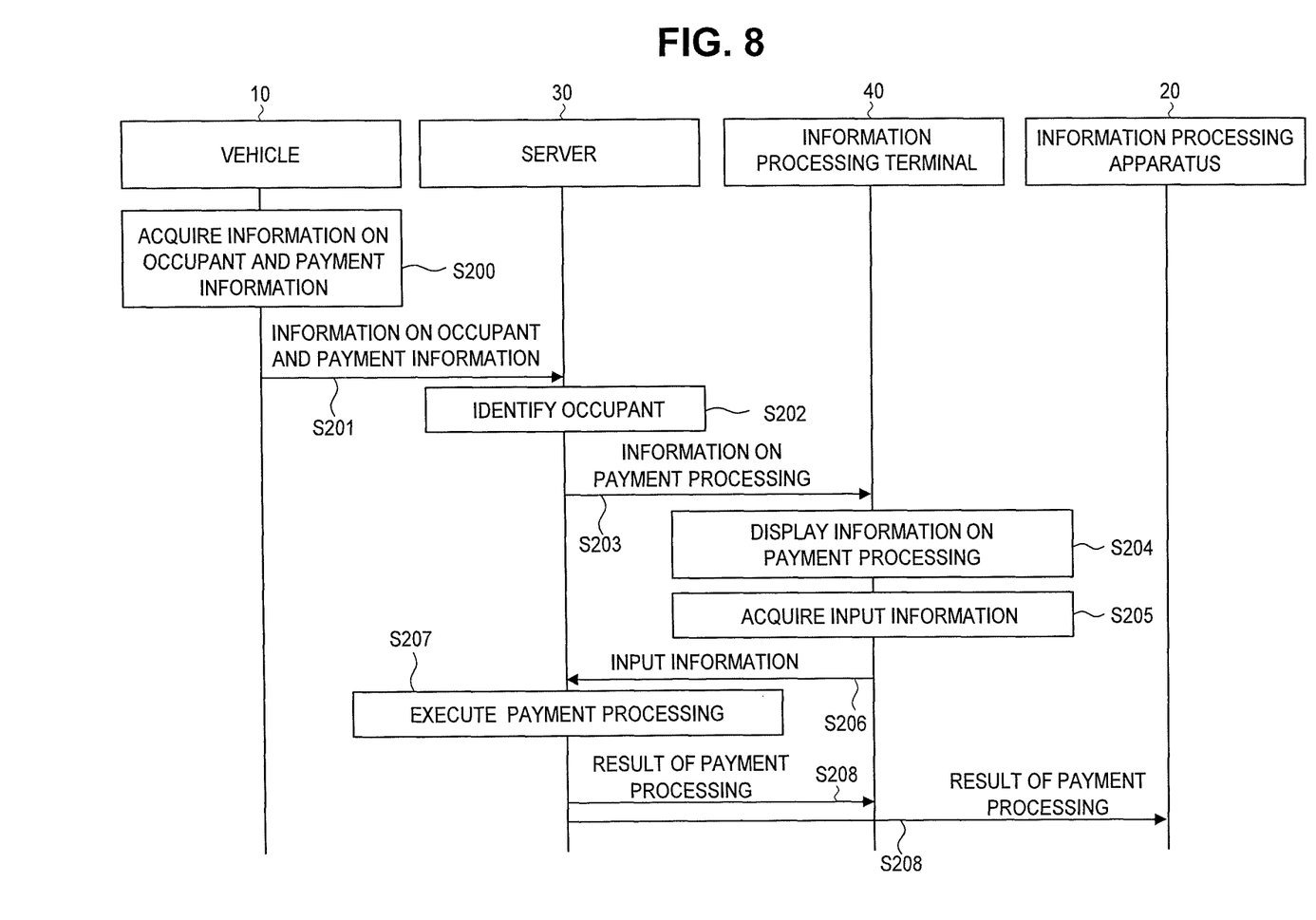
FIG. 8 is a sequence diagram illustrating a second example of the operation flow of the information processing system.

FIG. 8 is a sequence diagram illustrating a second example of the operation flow of the information processing system 1. FIG. 8 illustrates one example of a flow mainly executed between the server 30 and the information processing terminal 40. In particular, FIG. 8 illustrates one example of the flow from when the occupant of the vehicle 10 performs a selection operation on the provided content to when the payment processing is completed by using the information processing terminal 40. Referring to FIG. 8, one example of the operation flow of the information processing system 1 will be described.

Step S200: The control unit 11 of the vehicle 10 acquires, from the input unit 15, the input information, for example, information on when the occupant of the vehicle 10 selects the predetermined product from the product details output by the output unit 16. In this case, the control unit 11 acquires the payment information associated with the selected product. Additionally, the control unit 11 acquires the information on the occupant by means of the occupant information acquisition unit 17.

Step S201: The control unit 11 of the vehicle 10 transmits, to the server 30, the payment information associated with the product selected in step S200 by means of the communication unit 12. Additionally, the control unit 11 transmits the information on the occupant of the vehicle 10 to the server 30 by menas of the communication unit 12.

Step S202: The control unit 31 of the server 30 identifies the occupant of the vehicle 10 based on the information on the occupant acquired from the vehicle 10 in step S201.

Step S203: The control unit 31 of the server 30 transmits the information on payment processing including the payment information, acquired from the vehicle 10, to the information processing terminal 40 held by the occupant of the vehicle 10, identified in step S202.

Step S204: The control unit 41 of the information processing terminal 40 displays, on the display unit 44, the information on the payment processing acquired from the server 30 in step S203.

Step S205: The control unit 41 of the information processing terminal 40 acquires, from the input unit 45, the input information of a request for completing the payment, associated with the information on the payment processing, displayed by the display unit 44 in step S204.

Step S206: The control unit 41 of the information processing terminal 40 transmits, to the server 30, the input information, acquired in step S205, by means of the communication unit 42.

Step S207: The control unit 31 of the server 30 acquires the input information in step S206, and then executes the payment processing based on the information on the payment method of the occupant of the vehicle 10, stored in the storage unit 33.

Step S208: The control unit 31 of the server 30 transmits the results of the payment processing in step S207 to the information processing apparatus 20 and the information processing terminal 40 via the network 50.

As stated above, with the information processing system 1 according to one embodiment, it is possible to contribute to providing the content to the occupant of the vehicle 10 that effectively uses the identification mark. In particular, the identification mark captured by the image capturing unit 14 is associated with the content provided by the service provider, and thus it is possible to appropriately provide the content that the service provider desires to provide to the occupant of the vehicle 10 every time. For example, in a case where the content include the product details provided by the service provider to the customer, the service provider can appropriately provide the latest product details, which are updated in accordance with replacement or changes to the products, to the occupant of the vehicle 10. Consequently, the occupant of the vehicle 10 can check the various updated contents stated above.

For example, the information processing apparatus 20 does not need to execute a process for individually recognizing the vehicle 10 by continuously displaying the identification mark associated with the content that the service provider desires to provide for a predetermined period of the time during which the display unit 24 of the information processing apparatus 20 corresponds to the operation. When the identification mark is not displayed on the display unit 24, the information processing apparatus 20 needs to detect that the vehicle 10 arrives at the store or the commercial facility by using some method, in order to provide the content from the service provider to the occupant of the vehicle 10. The information processing system 1 according to one embodiment does not need the process of individually recognizing the vehicle 10 by means of the information processing apparatus 20, as stated above, by continuously displaying the identification mark on the display unit 24, whereby the vehicle 10 arriving at the store or the commercial facility can automatically acquire the content.

Additionally, the occupant of the vehicle 10 can easily check the various contents while staying in the cabin of the vehicle 10. For example, in a case where the vehicle 10 acquires the content based on the identification mark displayed in a location facing a public road by the store, the occupant of the vehicle 10 can easily acquire the content related to the store without having to enter the store by passing in front of the store. For example, in a case where the vehicle 10 acquires the content based on the identification mark displayed near the entrance of a drive-through of the store, the occupant of the vehicle 10 can easily check the content by means of the output unit 16 without looking at a signboard installed in the drive-through from a distance.

With the information processing system 1 according to one embodiment, it is possible to reduce the restrictions in the payment processing method upon providing the content to the occupant of the vehicle 10 by effectively using the identification mark, as stated above. In particular, the information processing terminal 40 held by the occupant of the vehicle 10 displays the information on the payment processing acquired from the server 30, and thus the occupant of the vehicle 10 can complete the payment processing by using the information processing terminal 40.

For example, the occupant of the vehicle 10 can also confirm the payment information displayed by the information processing terminal 40 inside the cabin of the vehicle 10, and then complete the payment processing in the cabin of the vehicle 10 by operating the input unit 45. In this case, the payment processing may be executed based on, for example, the operation flow described referring to FIG. 8. As stated above, the occupant of the vehicle 10 may operate the information processing terminal 40 only in the cabin of vehicle 10 upon completing the payment processing, and does not need to, for example, take out a wallet while in the drive-through to give money to an employee standing at a counter in the store. Therefore, the order and the payment are efficiently executed in, for example, the drive-through.

Since the identification mark is associated with the content that matches the information on the occupant acquired by the occupant information acquisition unit 17, the service provider can provide the content to which the occupant of the vehicle 10 has interest in accordance with the current state of the occupant of the vehicle 10. The occupant of the vehicle 10 can receive highly satisfactory content, in accordance with his/her current state, from the service provider.

The vehicle 10 can acquire the information on the occupant as visual information by acquiring the information on the occupant from the image captured by the interior camera. Consequently, the information processing apparatus 20 can accurately select the content that matches the information on the occupant based on the visual information. Similarly, the server 30 can accurately identify the occupant of the vehicle 10 based on the visual information.

The vehicle 10 can acquire various types of the information on the occupant, which cannot be acquired as visual information, by acquiring the information on the occupant of the vehicle 10 from output information output by any sensors capable of acquiring the information on the occupant. For example, the vehicle 10 can acquire sound information attributed to the occupant that cannot be acquired as visual information from output information output by a sound sensor. As another example, the vehicle 10 can acquire a subtle change in emotion attributed to the occupant's biological status that cannot be acquired as visual information from output information output by a biological sensor. As another example, the vehicle 10 can acquire biometric information of the occupant that cannot be acquired as visual information from output information output by a biometric sensor.

The vehicle 10 transmits the payment information to the server 30 based on the input information when the occupant selects the product, and thus the occupant of the vehicle 10 also can complete the payment processing in the cabin of the vehicle 10 via the server 30 by operating the information processing terminal 40. Thereby, the order and the payment are efficiently executed, and the convenience of the occupant of the vehicle 10 is improved.

Although the present disclosure has been described based on the drawings and examples, it should be noted that those skilled in the art can easily make various changes and modifications based on the present disclosure. Therefore, those variations and modifications are encompassed in the scope of claims of the present disclosure. For example, functions, and the like, included in each element, each step, or the like, can be rearranged so as not to be logically contradictory, and a plurality of elements, steps, or the like, may be combined into one or divided.

For example, in the embodiment described above, each component of the vehicle 10 has been described as being mounted on the vehicle 10. However, it is also possible to employ, for example, a configuration in which a voluntary electronic device such as a smartphone or a computer executes some or all of the processing operations performed by each component of the vehicle 10.

As another example, it is also possible to employ a configuration in which a general-purpose electronic device such as a smartphone and a computer functions as at least one of the components constituting the vehicle 10, the information processing apparatus 20, and the server 30 according to the embodiment stated above. As a further example, a program describing processing contents for implementing each function of the communication unit 12 and the like according to the embodiment is stored in the memory of the electronic device, and the program is read and executed by a processor of the electronic device. Therefore, the disclosure according to one embodiment can also be implemented as a program that can be executed by a processor.

In the embodiment stated above, the vehicle 10 and the information processing apparatus 20 have been described as being connected for communication via the network 50. However, the vehicle 10 and the information processing apparatus 20 may be directly connected to each other by using any communication method without using the network 50.

In the embodiment stated above, the server 30 has been described as directly acquiring the information on the occupant from the vehicle 10, acquired by the occupant information acquisition unit 17 of the vehicle 10, but the present disclosure is not limited thereto. For example, the server 30 may indirectly acquire, from the information processing apparatus 20, the information on the occupant similarly acquired from the vehicle 10 by means of the information processing apparatus 20.

What is claimed is:

1. An information processing system comprising:
   a vehicle;
   a server communicatively connected to the vehicle; and
   an information processing terminal that is held by an occupant of the vehicle and communicatively connected to the server,
   wherein the vehicle is configured to:
      capture an identification mark with an external camera, the identification mark being associated with content provided by a service provider;
      acquire the content associated with the captured identification mark;
      output the acquired content to the occupant in a cabin of the vehicle;
      acquire payment information based on the output content; and
      acquire information on the occupant in the cabin,
   wherein the server is configured to:
      identify the occupant based on the information on the occupant, acquired by the vehicle; and
      transmit information on payment processing including the payment information, acquired from the vehicle, to the information processing terminal held by the identified occupant,
   wherein the information processing terminal is configured to display the information on the payment processing acquired from the server.

2. The information processing system according to claim 1, wherein the identification mark is associated with the content that matches the information on the occupant, acquired by the vehicle.

3. The information processing system according to claim 1, wherein the vehicle includes an interior camera that captures the inside of the cabin of the vehicle, and is configured to acquire the information on the occupant from an image captured by the interior camera.

4. The information processing system according to claim 1, wherein:
   the content includes product details provided to a customer by the service provider; and
   the vehicle is configured to, in a case where the vehicle acquires input information when the occupant selects a predetermined product from the output product details, transmit the payment information associated with the selected product to the server.

5. The information processing system according to claim 1, wherein the identification mark includes a QR code.

6. A program operated in an information processing system including a vehicle, a server communicatively connected to the vehicle, and an information processing terminal that is held by an occupant of the vehicle and communicatively connected to the server,
   wherein:
   the program causes the vehicle to execute:
      capturing of an identification mark with an external camera, the identification mark being associated with content provided by a service provider;
      acquiring of the content associated with the captured identification mark;
      outputting of the acquired content to the occupant in a cabin of the vehicle;
      acquiring of payment information based on the output content; and
      acquiring of information on the occupant in the cabin;
   the program causes the server to execute:
      identifying of the occupant based on the information on the occupant acquired by the vehicle; and
      transmitting of information on payment processing including the payment information, acquired from the vehicle, to the information processing terminal held by the identified occupant; and
   the program causes the information processing terminal to execute:
      displaying of the information on the payment processing acquired from the server.

7. A control method adopted in an information processing system including a vehicle, a server communicatively connected to the vehicle, and an information processing terminal that is held by an occupant of the vehicle and communicatively connected to the server, the control method comprising:
   capturing, by the vehicle, an identification mark with an external camera, the identification mark being associated with content provided by a service provider;
   acquiring, by the vehicle, the content associated with the captured identification mark;
   outputting, by the vehicle, the acquired content to the occupant in a cabin of the vehicle;
   acquiring, by the vehicle, payment information based on the output content;
   acquiring, by the vehicle, information on the occupant in the cabin;
   identifying, by the server, the occupant based on the information on the occupant, acquired by the vehicle;
   transmitting, by the server, information on payment processing including the payment information, acquired from the vehicle, to the information processing terminal held by the identified occupant; and
   displaying, by the information processing terminal, the information on the payment processing acquired from the server.

* * * * *